United States Patent [19]

Bailey

[11] 4,355,973
[45] Oct. 26, 1982

[54] RADIANT HEATING APPARATUS

[75] Inventor: John M. Bailey, Dunlap, Ill.

[73] Assignee: Caterpillar Tractor Co., Peoria, Ill.

[21] Appl. No.: 277,747

[22] PCT Filed: Feb. 17, 1981

[86] PCT No.: PCT/US81/00210
§ 371 Date: Feb. 17, 1981
§ 102(e) Date: Feb. 17, 1981

[51] Int. Cl.³ .................. F27B 5/14; F24C 3/00
[52] U.S. Cl. ............................... 432/209; 126/91 A
[58] Field of Search .................. 432/30, 54, 209; 126/91 A

[56] References Cited

U.S. PATENT DOCUMENTS

| | | | |
|---|---|---|---|
| 2,046,419 | 7/1936 | Tourville | 263/16 |
| 2,399,609 | 4/1946 | Wainer | 432/206 |
| 2,868,277 | 1/1959 | Otto | 158/7.5 |
| 2,946,651 | 7/1960 | Houdry | 126/91 A |
| 3,223,135 | 12/1965 | Webber | 158/4.5 |
| 3,978,912 | 9/1976 | Penny et al. | 165/4 |
| 4,174,948 | 11/1979 | Bradley et al. | 432/54 |

Primary Examiner—John J. Camby
Attorney, Agent, or Firm—Wegner, Stellman, McCord, Wood & Dalton

[57] ABSTRACT

A radiant heating apparatus of the type that has a heating tube (13) with ends (14, 15) opening outside the furnace chamber (12), has first and second regenerator cores (33, 34) in opposite first and second tube ends (14, 15) and first and second fluid fuel burners (37, 38) in the tube (13) at the inner ends of the respective first and second cores (33, 34). A cycling control (30, 299) causes inlet air to be admitted to the first end (14) of the tube (13) while the first burner (37, 38) operates and to be exhausted through the second end (15) of the tube (13), thus heating the second core (34). Thereafter the cycling control (30, 299) causes inlet air to flow through the heated second core (34) while the second fluid fuel burner (37, 38) operates, thus heating the first core (33); and the unit continues to heat the regenerator cores alternately.

12 Claims, 5 Drawing Figures

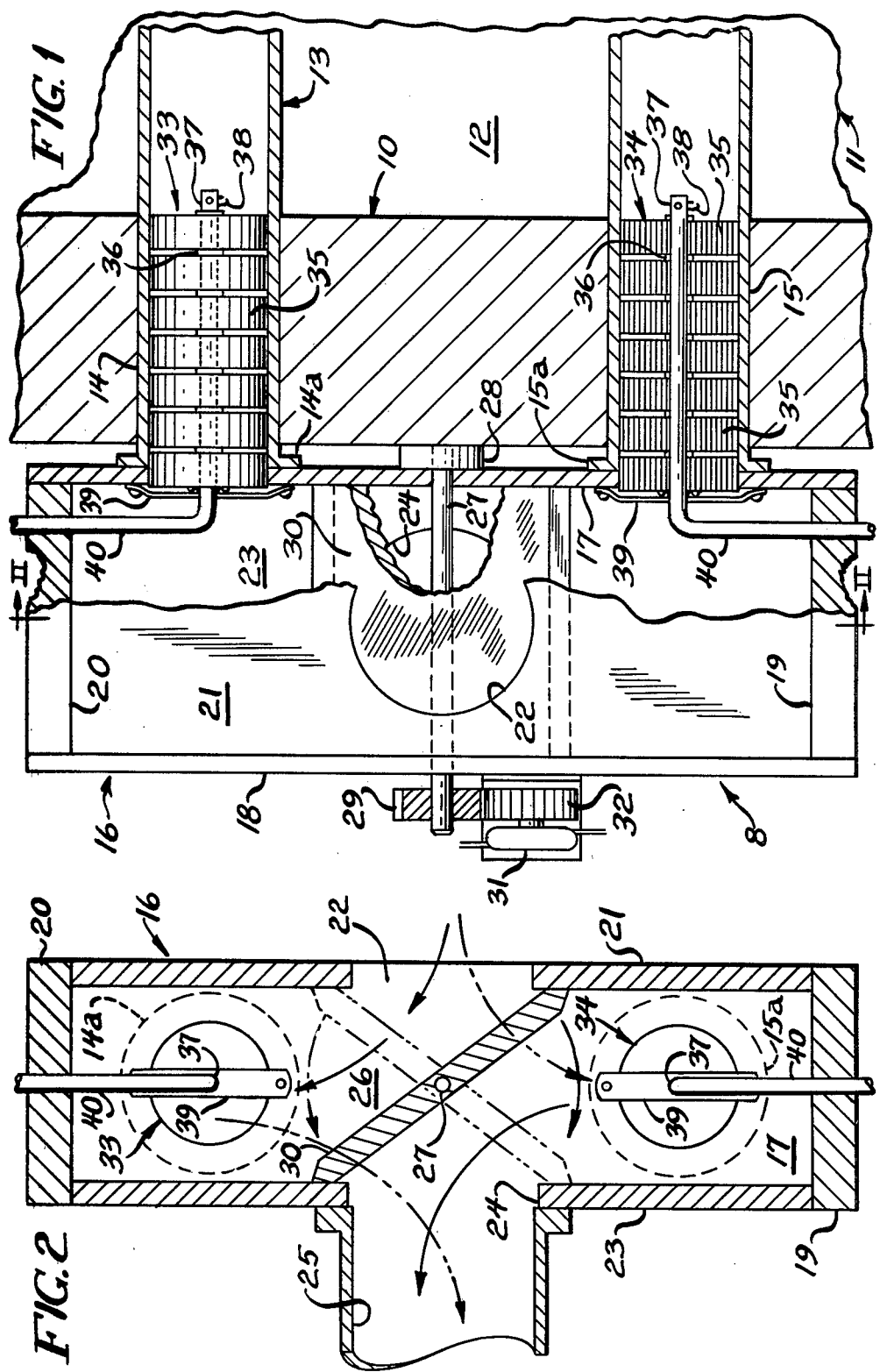

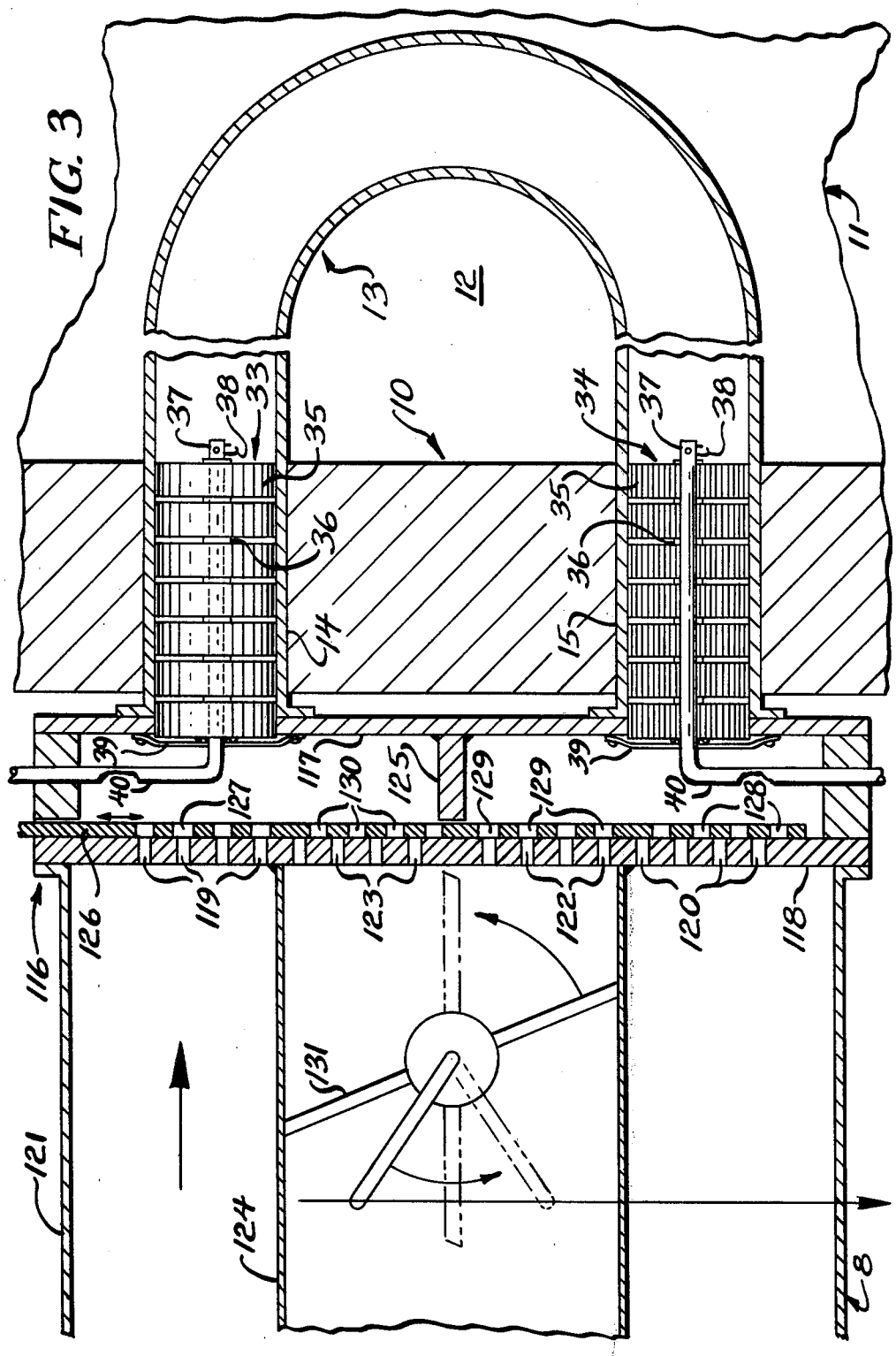

RADIANT HEATING APPARATUS

TECHNICAL FIELD

This invention relates to a radiant heating apparatus, and more particularly to a heating apparatus employing a radiant heating tube and a regenerator system.

BACKGROUND ART

Regenerative heat exchangers and recuperators have been commonly used in high temperature furnaces such as glass furnaces (Bradley et al. U.S. Pat. No. 4,174,948), open hearth furnaces (Tourville U.S. Pat. No. 2,046,419), and coke ovens (Otto U.S. Pat. No. 2,868,277). See also Webber U.S. Pat. No. 3,223,135, which refers to the common practice of cyclically reversing the flow of air and the supply of fuel to burners so that, after one half cycle when the furnace is first started up, the combustion air always passes over hot regenerator elements. More recently, regenerative heat exchangers have been used in gas turbine engines (Penney et al. U.S. Pat. No. 3,978,912).

The regenerator of U.S. Pat. No. 3,978,912 was especially engineered for use in automotive gas turbine engines, and thus had to be quite compact. Regenerators used in furnaces, on the other hand, have generally been large and required substantial, heavily insulated regenerators outside the furnace chamber. Such structures are not acceptable in modern manufacturing facilities where space is at a premium, and where furnaces must be used for such purposes as heat treating metal parts. Relatively compact radiant heating furnaces for this purpose are known to the prior art, but applicant knows of no recuperator or regenerator system applicable to such furnaces that does not greatly increase the space occupied by the furnace.

The foregoing illustrates problems of the known prior art. Thus, it is apparent that it would be advantageous to provide an alternative directed to overcoming one or more of the problems set forth above.

DISCLOSURE OF THE INVENTION

In accordance with the present invention, a radiant heating apparatus is of the type which has walls defining a chamber to be heated, a tube in the chamber with first and second end portions extending through the chamber wall, a fluid fuel burner in the tube, air inlet means through which combustion air is supplied to the burner, and combustion gas outlet means through which combustion products from the tube pass. The apparatus is supplied with a regenerator system which has first and second regenerator cores in the first and second end portions of the tube, and each of the regenerator cores has a large surface area over which gases may flow freely. First and second fluid fuel burners are immediately adjacent the inner ends of the respective first and second regenerator cores, and cycling means of the general type discussed in the Webber patent is provided to control airflow and combustion. The cycling means causes air from the inlet means to flow through the first regenerator core and fuel to be supplied only to the first fluid fuel burner to operate that burner, thereby producing hot combustion products which heat the second regenerator core as they pass to the stack. The cycling means then causes the air from the inlet means to flow through the heated second regenerator core and fuel to be supplied only to the second fluid fuel burner to operate that burner, thereby producing hot combustion products which heat the first regenerator core as they pass to the stack.

BRIEF DESCRIPTION OF THE DRAWINGS

FIG. 1 is a fragmentary sectional view of a first embodiment of a radiant heating apparatus supplied with the regenerative system of the present invention;

FIG. 2 is a fragmentary sectional view taken substantially as indicated along the line II—II of FIG. 1;

FIG. 3 is a fragmentary sectional view of a second embodiment of the invention;

BEST MODE FOR CARRYING OUT THE INVENTION

Figure 4:
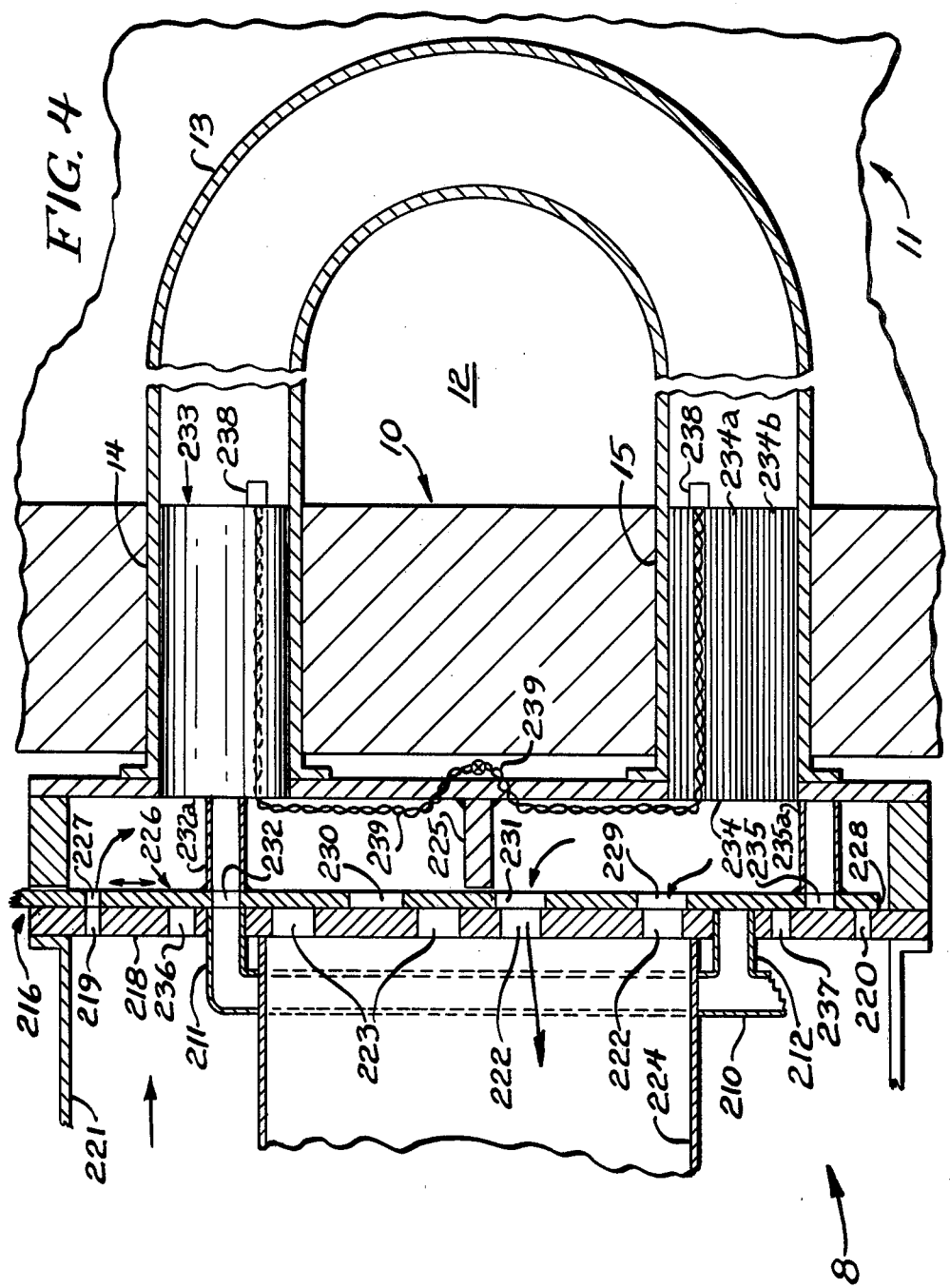
FIG. 4 is a fragmentary sectional view of a third embodiment of the invention designed particularly for use with low BTU producer, or coal gas.

Referring to the drawings in detail, and referring first to FIGS. 1 and 2, a radiant heating apparatus 8 includes a heavy upright furnace wall, indicated generally at 10 which cooperates with an end wall 11 and with four other walls (not shown) to define a radiant heating furnace chamber 12. The walls are all of about the same thickness, which may be from about 22.85 to 30.50 cm (9" to 12"), so the chamber 12 is heavily insulated to suffer minimum heat loss. Typically, the furnace chamber 12 may be used for heat treating metal parts, so one of the walls other than the wall 10 is provided with a heavily insulated, sealed door through which articles to be heat treated may be introduced to and removed from the furnace chamber. A U-tube, indicated generally at 13, has a first end portion 14 and a second end portion 15 which extend through the furnace wall 10 in spaced relationship to one another. As seen in FIGS. 3 and 4, the U-tube 13 extends a substantial distance into the chamber 12; and a large capacity furnace will be supplied with a series of U-tubes 13, all of which extend through the wall 10 in parallel, spaced relationship to one another. The U-tubes supply radiant heat to the furnace chamber 12, and are essentially conventional in this type of apparatus.

The extreme outer ends of the U-tube are provided with flanges 14a and 15a by means of which the U-tube is secured to an air box, indicated generally at 16. The air box 16 has an inner wall 17 and an outer wall 18 which are parallel to the furnace wall 10, and end plates 19 and 20. A side wall 21 contains an air inlet opening 22, while a side wall 23 has an opening 24 which communicates with a venting stack 25. Thus, the air inlet opening 22 and the air box 16 provide combustion air inlet means.

A throat 26 between the air inlet opening 22 and the outlet opening 24 is intersected by a shaft 27 which has one end supported in a bearing 28 mounted upon the wall 17 and the other end projecting through the wall 18 and provided with a drive gear 29. Mounted upon the shaft 27 is a butterfly valve 30 which may be rotated between the full line position of FIG. 2 and the broken line position of FIG. 2 so as to reverse the airflow from the air inlet 22 through the U-tube 13 to the venting stack 25. When the butterfly valve 30 is in the position illustrated in FIG. 2, airflow is from the inlet means through the end 14 of the U-tube, out the end 15 of the U-tube and to the venting stack 25. When the butterfly valve 30 is in the broken line position of FIG. 2, the airflow is from the inlet 22 into the end portion 15 of the U-tube 13, and out through the end portion 14 to the venting stack 25.

As illustrated in FIG. 1, reversible movement of the butterfly valve 30 may conveniently be provided by a reversible electric motor 31 on the shaft of which is a gear 32 that is in driving engagement with the gear 29 on the butterfly valve shaft 27; although other suitable means such as a hydraulic motor or a hydraulic cylinder may be used. Alternatively, since a radiant heating apparatus has a large number of U-tubes 13 arranged side by side, and there is an air box and butterfly valve for each such U-tube, the shaft 27 and the corresponding shafts for other butterfly valves may be provided with dual sprockets so that a single reversible motor may operate all the butterfly valves 30 through a system of driving chains, or electro-pneumatic, or direct solenoid actuator means, as is well known in the art.

The end portion 14 of the U-tube is provided with a first regenerator core, indicated generally at 33; while the second end portion 15 of the U-tube is provided with a second regenerator core, indicated generally at 34. The first and second regenerator cores are identical in construction, so only the core 34 is described in detail and like reference numerals are applied to the components of the two cores.

Each regenerator core consists of a plurality of annular segments 35 which are separated by spacers 36, and the regenerator cores surround a fuel gas tube 37 which has an igniter 38 at its outer end. Struts 39 are secured to the air box wall to support the gas tubes 37, and regenerator core segments 35 and the spacers 36. Fuel gas lines 40 extend into the air box and connect with gas tubes 37.

Each regenerator segment 35 is preferably of a suitable spiral metal or ceramic honeycomb construction, or might consist of packed stainless steel wire, porous metal or ceramic material in a configuration which does not materially impede the flow of air or combustion products through the U-tube. The fuel gas tubes 37 may, as is known in the art, be of ceramic or ultra-high temperature metal alloy.

As seen in FIG. 1, the regenerator cores 33 and 34 fit almost entirely within the thickness of the furnace wall 10, so that additional insulation is not required to avoid heat loss from the regenerators.

In addition, location of the regenerators within the end portions of the U-tube 13 greatly reduces the temperature of exhaust air passing to the venting stack 25, and makes it unnecessary to use high temperature materials except for the U-tube, the regenerator cores, and the gas tubes. Furthermore, the absorption of heat by the innermost regenerator segments 35 causes the outermost segments to be heated to a lesser extent, and thus may permit the use of less expensive materials for the more outer segments. Segmenting of the cores regardless of the material may be advantageous to reduce the adverse affects on heat transfer due to axial thermal conduction.

Figure 5:
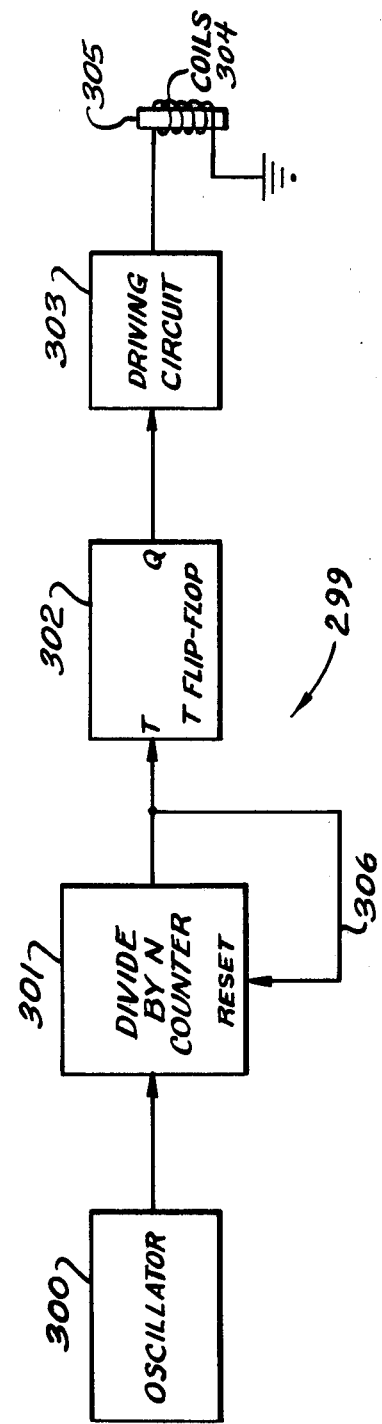
FIG. 5 is a diagrammatic view of the cycling means which controls airflow and combustion.

As previously indicated, the combustion is shifted cyclically between the first and second ends 14 and 15 of the U-tube 13, and the shift may be on a time cycle based upon the minimum time required to heat the regenerator cores to a desired temperature; or cycling may be controlled by thermal responsive means immediately associated with the two regenerator cores. A simple control system is illustrated in FIG. 5, but since the control system is applicable to the apparatus of FIGS. 3 and 4 as well as to the apparatus of FIG. 1, it will be described in detail only after the devices of FIGS. 3 and 4 are described.

Turning now to FIG. 3, the apparatus is like that of FIGS. 1 and 2 except for the air box structure and the valve arrangement for shifting the flow of inlet air and combustion gases to one end portion or the other of the U-tube 13. Accordingly, much of the structure of FIG. 3 is not described in detail, but like reference numerals are applied to those components which are the same as those in FIG. 1.

In the present apparatus, an air box, indicated generally at 116, has a wall 117 immediately adjacent and parallel to the furnace wall 10, and has an outer wall 118 which is provided with a first set of air inlet openings 119 opposite the U-tube end portion 14 and a second set of air inlet openings 120 opposite the second end portion 15 of the U-tube. An air supply duct 121 supplies combustion air to one or the other of the gas burners in the end portions of the U-tube, either through the openings 119 or the openings 120.

The air box wall 118 is also provided with a first set of exhaust openings 122 for combustion gases, and the exhaust openings 122 are operatively associated with the end portion 15 of the U-tube. A second set of exhaust openings 123 in the wall 118 is operatively associated with the end portion 14 of the U-tube. Thus, combustion gases may be exhausted either through the openings 122 or the openings 123 to a vent stack 124; and a partition 125 in the air box effectively prevents commingling of the incoming combustion air with the outgoing combustion gases.

Control of the flow of combustion air and combustion gases is by means of a flat reciprocable valve slide plate 126 which has a first set of air inlet orifices 127 which are illustrated in FIG. 3 in alignment with the air holes 119 in the air box wall 118; and the sliding plate valve 126 also has a second set of air inlet orifices 128 which, in FIG. 3, are out of alignment with the second set of air holes 120 in the wall 118 so that combustion air from the duct 121 may enter only the end portion 14 of the U-tube.

The slide valve plate 126 also has a first set of combustion gas outlet orifices 129 which, in FIG. 3, are aligned with the exhaust openings 122 in the air box wall 118; while a second set of combustion gas outlet orifices 130 is out of alignment with the exhaust openings 123 of the wall 118. Thus, exhaust gases from the end portion 15 of the U-tube pass through the orifices 129 and the holes 122 into the vent stack 124.

When the flow of inlet air and exhaust combustion products is to be reversed, the slide valve is moved upwardly as seen in FIG. 3 to close off the air inlet openings 119 and the outlet openings 122, while opening the inlet openings 120 and the outlet openings 123. At the same time, the flow of gas fuel to the burners is reversed, as previously described, so that the flow of hot combustion gases is always from the hot regenerator core toward the cool regenerator core.

Not mentioned in the description of the system of FIG. 1 is the fact that, in common with other similar furnaces, the present system is provided with an exhaust blower downstream in the vent stack 25 or the vent stack 124 of FIG. 3, so as to draw air through the system. This, of course, is conventional. As shown in FIG. 3, there is a damper 131 in the stack 124 which may be adjusted to control the rate of flow of air through the system; and a similar damper is in the system of FIG. 1, although not illustrated. The damper may be closed to conserve heat in the furnace when the burners are off.

Turning now to the form of the apparatus illustrated in FIG. 4, the furnace wall 10 and the U-tube 13 are as in the previous structures. Regenerator cores 233 and 234 in the respective U-tube end portions 14 and 15 are different from those in the first two embodiments for a reason that will be developed.

The apparatus of FIG. 4 constitutes a modification of the apparatus of FIG. 3 to make it suitable for use with low BTU producer, or coal gas. When such gas is used, the ratio of combustion air mass flow to coal gas mass flow may be only about 1.3:1. Thus, a very large quantity of coal gas is required, and to achieve any meaningful reduction in fuel usage it is necessary to preheat both the inlet air and the coal gas. Furthermore, since the inlet air and the coal gas are preheated to about 1500° F., it is necessary to keep them separate until they are both in the combustion device in the U-tube 13 to prevent premature autoignition.

The regenerator cores 233 and 234 are cylindrical, rather than annular, because no separate gas tube is employed. An air box 216 is broadly similar to the air box 116, but has an outer wall 218 which is somewhat differently arranged because of the difference in other components of the system. Thus, a gas manifold pipe 210 has branch pipes 211 and 212 which extend through the air box wall 218 in alignment, respectively, with the longitudinal axes of the respective regenerator cores 233 and 234. A first set of air inlet openings 219 and a second set of air inlet openings 220 are formed in the air box wall 218, although for simplicity only one of each such holes is illustrated. The air holes 219 and 220 communicate with a combustion air duct 221.

Also formed in the wall 218 are a first set of exhaust gas holes 222 and a second set of exhaust gas holes 223 which communicate with a vent stack 224. A partition 225 in the air box divides it into upper and lower sections, and thus performs the same function as the partition 125 in the apparatus of FIG. 3.

A slide plate type valve 226 has a first set of air inlet holes 227, of which one is shown in alignment with the air inlet opening 219. The opposite end of the slide plate valve 226 is short enough that when the valve is shifted upwardly in FIG. 4 to close off the air openings 219, the end 228 of the valve plate 226 uncovers the second set of air inlet openings 220.

The valve plate 226 is also provided with a first fuel gas inlet opening 232, and a first fuel gas director tube 232a is secured to the plate valve 226 in register with the fuel gas opening 232 so that when the opening 232 is aligned with the fuel gas branch pipe 211, as seen in FIG. 4, gas from the director tube 232a passes immediately into the regenerator core 233. A second fuel gas opening 235 in the plate valve 226 is illustrated as being out of alignment with the branch fuel gas pipe 212, so that there is no flow of gas from that branch pipe.

When the valve plate 226 is shifted upwardly, as seen in FIG. 4, gas flow from the branch pipe 211 and airflow through the openings 219 is terminated, while gas flow through the branch line 212 and airflow through the openings 220 is initiated. Gas from the branch line 212 goes through the opening 235 and through a fuel gas director tube 235a directly into a second regenerator core 234.

The air box wall 218 is also provided with a first purge air slot 236 and with a second purge air slot 237 which communicate with the air manifold 221 so that, as the slide valve 226 is moved from the position of FIG. 4 to a position in which the gas line 212 is open, the gas director tube 232a is momentarily aligned with the purge slot 236 so as to blow residual gas from the director tube into the regenerator core 233. Similarly, as the plate valve 226 is being returned to the position of FIG. 4, the gas director tube 235a is momentarily aligned with the purge slot 237 so that residual gas in the director tube 235a is blown into the regenerator core 234.

The valve plate 226 also has a first exhaust gas orifice 229 which, in FIG. 4, is aligned with the exhaust gas opening 222 of the wall 218; and a second exhaust gas orifice 230 is out of alignment with the gas exhaust opening 223 of the wall 218. In the particular embodiment illustrated in FIG. 4, one gas exhaust orifice 231 in the valve plate 226 may be aligned either with an exhaust gas opening 222 or with an exhaust gas opening 223.

The structure of the regenerator cores 233 and 234 is such that they provide uninterrupted, separate passages, as seen in the core 234. Thus, fuel gas from the director tubes 232a and 235a enters only those passages 234a which are aligned with it, while combustion air enters only the passages 234b which surround those through which the fuel gas passes; and there is no mixing of fuel gas and air within the regenerator cores which could cause premature ignition. However, during the exit flow after combustion, the exhaust gas flows through all the regenerator core passages.

Conventional ignition devices 238 are illustrated at the inner ends of the respective cores 233 and 234, and electric leads 239 for the igniters 238 extend through one (or more) of the air passages, such as a passage 234b. Such ignition devices may rarely be needed because the entering fuel gas and combustion air often are initially hot enough for autoignition. The diameters of the director tubes 232a and 235a relative to the regenerator cores 233 and 234 are selected as a function of the required air/fuel ratio for any particular fuel gas.

It is well known to those skilled in the gas burner art that the varying BTU's in different kinds of gas require different air fuel ratios for proper combustion. Thus, for example, natural gas yields approximately 1,000 BTU per cubic foot, and a proper air fuel ratio is about 10:1. On the other hand, coal, or producer gas manufactured by the simplest methods may run as low as 135 to 150 BTU per cubic foot. At the lower end of the range, air fuel ratios may be as low as 1:1.

In the form of the invention illustrated in FIG. 4 it is necessary that the diameter of the fuel gas director tubes 232a and 235a bear a predetermined relationship to the diameter of the regenerator cores 233 and 234, so as to provide equal temperature rise for the gas and air through the regenerator core. When the diameter of the director tubes is increased, there are more passages 234a devoted to transmitting fuel gas, and fewer passages 234b in the surrounding annular area devoted to transmitting air. Thus, changes in the diameter of the director tubes may adapt the apparatus to use with gaseous fuels having a wide variety of BTU outputs.

It is significant, also, that the removal of a fuel gas director tube from its position opposite the end of the regenerator core, as in the case of the director tube 235a in FIG. 4, is solely so that the entire area of the regenerator core is available for the discharge of hot combustion gases. Consequently, although the apparatus described in FIG. 4 shows the director tubes being moved radially with reference to the regenerator cores, the same result could be achieved by moving the director tubes axially away from the regenerator cores. Such an arrangement would, for example, make it practical to use the apparatus having director tubes for low BTU fuels with a butterfly valve of the kind illustrated in FIGS. 1 and 2, rather than with the slide plate valve illustrated in FIG. 4. In such a system, fuel gas flow might be controlled by the operation of conventional gas valves, as hereinafter stated with reference to FIG. 5 which speaks of the operation of conventional gas valves for the lines 40 of the first two embodiments of the invention.

FIG. 5 illustrates a suitable control circuit, indicated generally at 299, for actuating the valves of the regenerator system, and for also controlling fuel gas flow to the gas pipes 40 of the first two embodiments of the invention so that combustion takes place at the desired end portion of the U-tube 13. The illustrated circuit is time controlled.

An oscillator 300 forms an input to a divide-by-N counter 301 which counts the pulses developed by the oscillator 300 and provides an output pulse when N pulses have been accumulated. The frequency at which the output pulses are developed by the counter 301 is determined by the frequency of the oscillator 300, and by the value chosen for the variable N.

The output pulse from the divide-by-N counter 301 is coupled to a T flip-flop 302, the output of which changes state each time an input pulse is received. The output from the T flip-flop 302 functions through a driving circuit 303 to energize a coil 304, which in turn drives an armature 305 to control the driving means for the valve 30, 126, or 226; and also to operate conventional gas valves for the lines 40.

A feedback line 306 couples the output signal from the counter 301 back to its reset input to reinitiate counting of the pulses developed by the oscillator.

Alternatively, a temperature sensing based switching network may be utilized to energize the coil 304 in response to temperatures within the system. A thermocouple or thermistor, preferably located at the exit of each regenerator core, may be used in a conventional circuit to provide switching of the coil 304 between energized and deenergized states when the temperature reaches a predetermined value. A thermocouple or thermistor may also be used to sense excessive temperature and activate a safety shut-off, as is well known in the furnace art.

The foregoing detailed description has been given from clearness of understanding only, and no unnecessary limitations should be understood therefrom as modifications will be obvious to those skilled in the art.

INDUSTRIAL APPLICABILITY

The regenerator system of the present invention may be utilized in any radiant heating apparatus of a type in which combustion occurs within the furnace in a radiant heating tube, even though the tube, in some cases, may not be a U-tube. A non-U-tube type furnace would, of course, require modification of the valving arrangements; but the same principle could be employed.

The principal purpose of employing a regenerator system is to reduce fuel requirements. Based upon experience with other types of regenerator systems, the apparatus of the present invention may permit fuel savings of the order of 50 percent.

The present invention provides a regenerator system for radiant heat furnaces which require very little increase in the space occupied by the furnace; and the reduced temperature of the exhaust gases eliminates the need for any high temperature alloys outside the furnace proper. Stack temperatures can be of the order of 600° F.

The regenerator segments are low in cost and simple, because no separation of gas or air is required in the heat exchanger proper (unlike recuperators). Although the regenerator segments are shown spaced apart by spacers, the spacers can be eliminated so the segments are stacked on top of each other.

I claim:

1. In a radiant heating apparatus of the type which has wall means (10,11) of substantial thickness defining a chamber (12) to be heated, a tube (13) in the chamber with first and second end portions (14,15) extending through the wall means (10,11) fuel gas supply pipes (40,210) and air inlet means (16,121,221) through which a combustible air-fuel mixture is supplied to the tube to be burned therein, and combustion gas outlet means (24/25,124,224) through which combustion products from the tube pass, the improvement comprising:

first and second regenerator cores (33/34,233,234) in the respective first and second end portions (14,15) of the tube (13), each of said cores having an outer end and an inner end, having a large surface area over which gases may flow freely, and occupying substantially the entire portions of the tube that are within the thickness of the wall means;

fuel gas supply pipes (40,210) for supplying fuel gas to the tube (13) adjacent both end portions (14,15) thereof;

air inlet means (16,121,221) for supplying combustion air to both end portions (14,15) of the tube (13);

and cycling means (30/126/226,299) to control flow of fuel gas and air into the tube (13) to be burned therein, said cycling means causing combustion air to flow through the first regenerator core (33,233) and causing gas to flow to be mixed with said combustion air and burned inwardly of said first core (33,233), thereby producing hot combustion products which heat the second regenerator core (34,234) as they pass to the outlet means (24/25,124,224) and said cycling means then causing combustion air to be heated as it flows through the heated second regenerator core (34,234), to be combined with fuel gas and burned immediately inwardly of said second core (34,234), thereby producing hot combustion products which flow over and heat the first regenerator core (33,233) as they pass to the outlet means (24/25,124,224).

2. The improvement of claim 1 including first and second fuel burner means (37) immediately adjacent the inner ends of the respective first and second regenerator cores (33 and 34).

3. The improvement of claim 2 in which each regenerator core (33,34) comprises a stack of core elements (35).

4. The improvement of claim 3 in which the core elements (35) are metal, said core elements (35) adjacent the inner end of each core (33,34) consist of a high temperature alloy, and the core elements (35) adjacent the outer end of each core (33,34) consist of a lower temperature alloy.

5. The improvement of claim 1 in which the tube (13) is a U-tube which has its first and second end portions (14,15) side by side, the air inlet means (16,22) and the combustion gas outlet means (24,25) have a common portion (26) adjacent said tube end portions 14, 15), and the cycling means (30,299) includes a valve (30) which selectively isolates parts of said common portion (26) so said isolated parts function cyclically to connect the first end (14) and then the second end (15) of the tube (13) to the air inlet means (16,22) and the other end to the combustion gas outlet means (24,25).

6. The improvement of claim 5 in which the common portion (26) includes a throat, and the valve (30) is a butterfly valve in said throat.

7. The improvement of claim 1 in which the tube (13) is a U-tube which has its first and second end portions (14,15) side by side, a wall (118,218) defines a side of an air box (116,216) with which both ends (14,15) of the U-tube (13) and the combustion gas outlet means (124,224) communicate, said air box wall (118,218) has openings to the atmosphere (119/120,219,220) and to the venting stack (122/123,222/223) and the cycling means includes a slidable valve plate (126,226) having holes (127/128/129/130,227/228) which are selectively movable into and out of register with different ones of said openings to cyclically connect the first end (14) and then the second end (15) of the tube (13) to the atmosphere and the other end to the combustion gas outlet means (124,224).

8. The improvement of claim 7 which includes a fuel gas manifold (210) which has first and second pipes (211,212) that open through the air box wall (218) opposite the respective first and second ends (14,15) of the U-tube (13), and the valve plate has first and second holes (232,235) each in register with a fuel gas director tube (232a,235a) on the plate (226) to conduct fuel gas across the air box (216) from one of the manifold pipes (211,212) to the corresponding end (14 or 15) of the U-tube (13), each such fuel gas director tube (232a,235a) being aligned with a manifold pipe (211,212), while the valve plate (226) blocks the other manifold pipe (211,212) so fuel gas may be admitted alternately to the first and second ends (14 or 15) of the U-tube (13) by moving the valve plate (226), and in which each of the regenerator cores (233,234) consists of means providing a multiplicity of uninterrupted, separate passages to isolate fuel gas and combustion air in the cores (233,234) from one another.

9. The improvement of claim 1 in which each of the regenerator cores (233,234) consists of means providing a multiplicity of uninterrupted separate passages to isolate fuel gas and combustion air in the cores (233,234) from one another, a fuel gas manifold (210) adjacent an air box wall (218) is adapted to supply fuel gas to the cores (233,234), fuel gas director tubes (232a,235a) conduct fuel gas from said manifold (210), respectively, across the air box (216) to a corresponding end (14,15) of the U-tube (13) to direct fuel gas into the ends of the respective cores (233,234), and means controlled by the cycling means (299) for moving said fuel gas director tubes (232a,235a) alternately into and out of communication with said cores (233,234).

10. The improvement of claim 1 in which the fuel gas supply pipes (40,210) supply fuel gas at the outer ends of the first and second regenerator cores (33/34,233/234) so said fuel gas passes through said cores before it is combined with combustion air and burned in the tube (13) inwardly of each of said cores.

11. The improvement of claim 10 in which a gas tube (37) extends through each core (33,34) to conduct fuel gas from the fuel gas supply pipes (40) through the cores.

12. The improvement of claim 10 in which each of the regenerator cores (233,234) consists of means providing a multiplicity of uninterrupted separate passages to isolate fuel gas and combustion air in the cores from one another.

* * * * *